US011964859B2

(12) United States Patent
Meijer

(10) Patent No.: US 11,964,859 B2
(45) Date of Patent: Apr. 23, 2024

(54) MODULAR SLIDING FORK FOR A FORK-LIFT TRUCK OR PALLET TRUCK, FORK-LIFT TRUCK OR PALLET TRUCK PROVIDED THEREWITH AND METHOD THEREFOR

(71) Applicant: Meijer Holding B.V., Sint Jacobiparochie (NL)

(72) Inventor: Hendrik Meijer, Sint Jacobiparochie (NL)

(73) Assignee: Meijer Holding B.V., Sint Jacobiparoch (NL)

( * ) Notice: Subject to any disclaimer, the term of this patent is extended or adjusted under 35 U.S.C. 154(b) by 348 days.

(21) Appl. No.: 16/769,641

(22) PCT Filed: Dec. 5, 2018

(86) PCT No.: PCT/NL2018/050811

§ 371 (c)(1),
(2) Date: Jun. 4, 2020

(87) PCT Pub. No.: WO2019/112427

PCT Pub. Date: Jun. 13, 2019

(65) Prior Publication Data

US 2020/0331735 A1 Oct. 22, 2020

(30) Foreign Application Priority Data

Dec. 6, 2017 (NL) ..................................... 2020027
Aug. 9, 2018 (NL) ..................................... 2021448

(51) Int. Cl.
*B66F 9/12* (2006.01)
*B66F 9/20* (2006.01)

(52) U.S. Cl.
CPC ................ *B66F 9/122* (2013.01); *B66F 9/20* (2013.01)

(58) Field of Classification Search
CPC .................................. B66F 9/122; B66F 9/20
See application file for complete search history.

(56) References Cited

U.S. PATENT DOCUMENTS 2,536,068 A * 1/1951 Lehmann ................ B66F 9/122 414/664
2,788,909 A * 4/1957 Kughler .................. B66F 9/122 414/664

(Continued)

FOREIGN PATENT DOCUMENTS

CN 103982500 A 8/2014
CN 203833571 U 9/2014

(Continued)

*Primary Examiner* — Jonathan Snelting
(74) *Attorney, Agent, or Firm* — THE WEBB LAW FIRM

(57) ABSTRACT

The invention relates to a modular sliding fork for a fork-lift truck or pallet truck, a fork-lift truck or pallet truck provided therewith and a method therefor. The modular sliding fork includes a sliding part configured to be adjusted in length direction relative to a fork part of a fork of a fork-lift truck or pallet truck, a drive system for sliding the modular sliding fork relative to the fork part for the purpose of extending and/or shortening the fork; and a locking mechanism for locking the modular sliding fork relative to the fork part at a desired position. The drive system utilizes a movement of the fork-lift truck or pallet truck for the purpose of sliding the modular sliding fork.

15 Claims, 17 Drawing Sheets

(56) References Cited

U.S. PATENT DOCUMENTS

| | | | | | |
|---|---|---|---|---|---|
| 2,819,811 | A * | 1/1958 | Quayle | B66F 9/122 414/785 |
| 2,973,878 | A * | 3/1961 | Gibson | B66F 9/122 414/664 |
| 4,402,644 | A * | 9/1983 | Barchard | B66F 9/122 414/661 |
| 4,498,837 | A * | 2/1985 | Kooi | B66F 9/122 414/664 |
| 9,745,180 | B2 * | 8/2017 | Meijer | B66F 9/12 |
| 2008/0152469 | A1 | 6/2008 | Bates | |
| 2009/0314582 | A1 * | 12/2009 | Meijer | B66F 9/122 187/237 |
| 2012/0211308 | A1 * | 8/2012 | Issartel | B66F 9/12 187/237 |

FOREIGN PATENT DOCUMENTS

| | | | |
|---|---|---|---|
| CN | 204625095 | U | 9/2015 |
| CN | 204675759 | U | 9/2015 |
| DE | 8806324 | U1 | 8/1988 |
| DE | 3925668 | A1 | 2/1991 |
| DE | 202016003279 | U1 | 6/2016 |
| EP | 1449807 | A1 | 8/2004 |
| GB | 2121759 | A | 1/1984 |
| JP | S5011266 | U1 | 2/1975 |
| NL | 2011022 | C2 | 12/2014 |

* cited by examiner

MODULAR SLIDING FORK FOR A FORK-LIFT TRUCK OR PALLET TRUCK, FORK-LIFT TRUCK OR PALLET TRUCK PROVIDED THEREWITH AND METHOD THEREFOR

CROSS-REFERENCE TO RELATED APPLICATIONS

This application is the United States national phase of International Application No. PCT/NL2018/050811 filed Dec. 5, 2018, and claims priority to The Netherlands Patent Application Nos. 2010027 filed Dec. 6, 2017, and U.S. Pat. No. 2,021,448 filed Aug. 9, 2018, the disclosures of which are hereby incorporated by reference in their entirety.

BACKGROUND OF THE INVENTION

Field of the Invention

The invention relates to a modular sliding fork for a fork-lift truck or pallet truck. The modular sliding fork relates in particular to a system for length adjustment of a fork of a fork-lift truck or pallet truck.

Description of Related Art

In practice many goods are transported on pallets or other carriers. Use is here made in practice of different types and dimensions of such palettes. Many pallets are also provided with a different length and width dimension, and it can be advantageous to pick up pallets from the front or conversely from a side. This means that forks of a fork-lift truck or pallet truck can for instance protrude beyond the pallet during pick-up thereof, this resulting in a risk of damage to other goods and/or persons. In the case of a relatively large pallet, it can also protrude over the forks, which creates the risk of the pallet falling off the fork. This entails a safety risk and the risk of damage to products.

Known in practice are fork-lift trucks which are for this reason provided with length-adjustable forks. These length-adjustable forks are usually provided with a drive. This requires a complex drive system which usually takes a hydraulic form, wherein the extendable forks are coupled with their drive to the system of the fork-lift truck. This is relatively complex and expensive. This also requires additional maintenance and entails the risk of failure.

Also known is a manually length-adjustable fork for a fork-lift truck, for instance described in NL 2011022. In such a fork a slidable fork part can be displaced relative to a fixed fork part. Because the adjustment can be performed manually, it is possible to dispense with a relatively complex drive. This makes such an extendable fork effective and relatively simple. A problem is here that a fork-lift truck driver for instance has to get off the fork-lift truck for the purpose of adjusting the fork. Especially in the case that dimensions of the pallets to be displaced keep varying does this manual adjustment have to take place frequently. This is time-consuming for the driver, which adversely affects the efficiency of the logistical function. Because this is not experienced as user-friendly in all cases, there is a risk that a driver will not consistently adapt the length of the fork to the load to be picked up, for instance in the case of a one-time variation in dimensioning. Risks in respect of safety and damage hereby continue to exist.

SUMMARY OF THE INVENTION

The present invention has for its object to provide a modular sliding fork for a fork-lift truck or pallet truck whereby the above stated problems are obviated or at least reduced.

This object is achieved with the modular sliding fork for a fork-lift truck or pallet truck, wherein the sliding fork according to the invention comprises:

- a sliding part configured to be adjusted in length direction relative to a fork part of a fork of a fork-lift truck or pallet truck;
- a drive system for sliding the modular sliding fork relative to the fork part for the purpose of extending and/or shortening the fork; and
- a locking mechanism for locking the modular sliding fork relative to the fork part at a desired position,
- wherein the drive system utilizes a movement of the fork-lift truck or pallet truck for the purpose of sliding the modular sliding fork.

By providing the modular sliding fork slidably relative to a (fixed) fork part of a fork-lift truck or pallet truck the effective fork length can be adjusted. The length can hereby be adapted to the load to be displaced, for instance to the dimensions of one of the different (standard) types of pallet. This reduces the risk of damage during picking up, setting down and/or manoeuvring of the load. The safety risk in respect of other persons is also reduced.

By providing a drive system the length of the fork can be adjusted, for instance by sliding the modular sliding fork relative to the fork part, wherein the sliding fork and the fork part together form the fork of a fork-lift truck or pallet truck. Other drive systems are likewise possible. The relative position of the modular sliding fork according to the invention and the fork part is further fixed, i.e. locked, at a desired position with the locking mechanism. This prevents an undesired extension or shortening of the fork.

According to the invention, the drive system of the modern sliding fork utilizes a movement, for instance a displacement and/or a descending movement and/or an inclining movement of the forks, of the fork-lift truck or pallet truck for the purpose of moving a modular sliding fork relative to the fork part thereof. Utilizing the movement, such as a displacement, of the fork-lift truck or pallet truck for the drive system for the purpose of sliding of the modular sliding fork makes it possible to perform the extension or shortening of the fork in effective manner by movement of the fork-lift truck or pallet truck. In the case of a fork-lift truck the driver can therefore remain in the cab while the length of the forks is adjusted. This makes the modular sliding fork according to the invention user-friendly and decreases the time needed to adjust the fork length for thereby adapting it to the dimensions of the load to be picked up. This increases the overall safety and efficiency of the logistical operation. When a load with different dimensions has to be picked up incidentally, a driver will adapt the fork length thereto in relatively simple manner because of the increased user-friendliness. In practice this improves the safety during the logistical operation further still, and reduces the chance of damage to the goods. A tube profile of the modular sliding fork is preferably configured as outer fork which slides over the fixed fork part of the fork-lift truck or pallet truck in use. The dimensions of the tube profile of the sliding fork are here adapted to the fixed fork part.

Because the drive system according to the invention utilizes the movement of the fork-lift truck or pallet truck, use can be made of a relatively simple drive for the purpose of adjusting the length of the fork. This means that a hydraulic coupling between the modular sliding fork and the fork-lift truck or pallet truck provided therewith can preferably be dispensed with. Electric cabling between the sliding fork and the fork-lift truck or pallet truck is further preferably likewise dispensed with. In this way the modular sliding fork according to the invention can be applied in simple manner to both new and existing fork-lift trucks or pallet trucks. This considerably increases the utility of such sliding forks. This flexible utility also enables a user him/herself to perform the installation and/or removal of the modular sliding fork on his/her own fork-lift truck or pallet truck. This increases the convenience of use and reduces costs, for instance maintenance costs.

The profile of a modular sliding fork is preferably provided from a tube profile, whereby production costs can remain limited. Use is for instance made here of an folding/bending process and/or rolling process and/or extrusion process in the manufacture of such a tube profile. A profiled tube profile can if desired be provided here for additional functionality and/or additional strength of the tube profile. A suitable design of such a tube profile makes it possible to further reduce material costs and/or increase the strength of the fork. The wall thickness of such a tube profile preferably lies in the range of 3-10 mm, for instance 3-4 mm. If desired, the tube profile can also be given wholly or partially different dimensions.

In one of the currently preferred embodiments according to the invention the drive system is provided with a contact element configured to slide a modular sliding fork relative to the fixed fork part in contact with the ground surface and/or other object.

Providing a contact element which can be brought into contact with the ground surface by a driver or user makes it possible to vary the fork length through this contact in combination with the movement, for instance displacement, of the fork-lift truck or pallet truck. It is also possible to perform the relative movement between sliding fork and fixed fork part by contact with an object, such as a wall, post, edge and the like, in a number of embodiments according to the invention.

In a currently preferred embodiment this contact element comprises a friction block. By bringing the friction block into contact with the ground surface, for instance by having the fork of the fork-lift truck rest on the ground surface, and then moving the fork-lift truck the modular sliding fork with the contact element will remain substantially at the same position as a result of the occurring friction forces, while the fork part of the fork-lift truck co-displaces with this fork-lift truck. This results in a relative movement between the modular sliding fork and the fork part, whereby it is extended or shortened. Such a friction block is for instance manufactured from polyurethane. It will be apparent that other suitable materials can also be used.

In a further preferred embodiment according to the invention the contact element comprises a drive roller or drive wheel.

By providing the contact element as a drive roller or drive wheel it is possible to bring the contact element into contact with the ground surface, in the case of a fork-lift truck for instance by lowering the forks onto the ground surface, and by rotation of the roller or wheel, which is preferably provided on the fork part. The modular sliding forks are displaced relative to the fork part. In such an embodiment both the modular sliding fork and the fork part therefore preferably move at the position of the fork-lift truck as a result of the extension or shortening of the fork. In a currently preferred embodiment the transmission between the drive roller or drive wheel is provided such that, when the fork-lift truck is moved forward, the modular sliding fork moves forward and a longer fork is consequently provided. This has the particular advantage that a driver or user of the fork-lift truck faces forward during the forward movement for the purpose of increasing the length of the fork, and therefore has a view of the space in which the fork moves. This increases the safety during extension or shortening of the fork. In such an embodiment the fork will preferably shorten when the fork-lift truck moves rearward. The safety is here also guaranteed. In this way an effective and safe fork according to the invention is provided. A transmission is optionally provided such that a movement of for instance a fork-lift truck over a certain distance results in a greater extension or shortening of the fork.

In a further preferred embodiment according to the invention the contact element is operatively connected to an energy storage system configured to store energy for the purpose of extending and/or shortening the fork.

By providing an energy storage system the extension and/or shortening of the forks can be performed in effective manner, without the need to provide an external energy source. The energy storage system is for this purpose for instance provided with a spring mechanism, such as a spring, gas spring, hydraulic accumulator and the like, which is for instance compressed during shortening. This compression is for instance realized by moving the nose of the fork as contact element against a wall, post or edge with a fork-lift truck, such that the fork is shortened. The stored energy can be used for extension of the forks, for instance after the locking is released. A sliding fork operating independently of a hydraulic or electrical coupling with the fork-lift truck is hereby provided.

In an advantageous preferred embodiment according to the invention the locking mechanism comprises a plurality of locking positions for locking the modular sliding fork relative to the fork part at more than a minimum and maximum length of the fork.

Providing a locking mechanism enables a safe operation. By providing the locking mechanism with a plurality of locking positions a flexible adaptation to the diverse dimensionings of loads to be picked up which occur in practice is obtained. Use can be made here of for instance a pin-hole connection, wherein a plurality of holes is provided in a tube profile of the fork, a gear rack mechanism with which a locking is provided, or another suitable locking system.

The locking mechanism preferably further comprises a locking drive, wherein the locking drive can control the locking mechanism remotely. This makes it possible for a driver or user to activate or conversely deactivate the locking mechanism in effective manner. It is possible here for the driver to control the locking mechanism from the cab of a fork-lift truck. This further makes the use user-friendly in practice. The locking mechanism is further preferably provided with a sensor configured to detect a correct locking. This further increases the safety for remote control of the locking mechanism, for instance with a remote control from the cab of a fork-lift truck. It will be apparent that such a sensor can be provided in several ways, for instance on the basis of a contact or another signal.

The locking mechanism is preferably further provided with a battery. By providing a separate energy supply for the locking mechanism the modular sliding fork according to the invention can act substantially independently of drives of the fork-lift truck or pallet truck in effective manner. The simple installation and removal is hereby preserved for the modular sliding fork according to the invention.

In a currently preferred embodiment the locking mechanism is provided with a charging mechanism. By providing the locking mechanism with a charging mechanism the energy required for the locking mechanism is provided in effective manner, preferably without this energy having to be provided from the fork-lift truck or pallet truck. Use can for instance be made for this purpose of the movement of the fork-lift truck or pallet truck, for instance by providing the charging mechanism with a spring or spring mechanism. The spring can thus for instance be compressed during movement of the fork-lift truck or pallet truck and then activate the locking by release thereof. It will be apparent that diverse mechanisms and systems are available for this purpose.

A sensor system is optionally provided for the modular sliding fork according to the invention. It is possible here to envisage a length measurement using for instance a cable transducer, a laser, an ultrasonic sensor. It is also possible to detect bending using for instance an angle measurement and a weight measurement. This can further increase the safety of the modular sliding fork according to the invention. If desired, such a sensor system makes use of a transmitter and/or transmitter/receiver for the purpose of providing a wireless sensor system which is for instance in operative connection with a control.

The invention further relates to a fork-lift truck or pallet truck comprising an extendable fork in an embodiment according to the invention.

Such a fork-lift truck or pallet truck provides similar advantages and effects as described for the modular sliding fork.

In an advantageous embodiment the fork-lift truck or pallet truck comprises a guide configured to guide the relative movement between the modular sliding fork and the fork part. A rail, strip or cams are for this purpose for instance provided in order to guide the movement. Such a guide can for instance be provided in or on a fork part and/or on or in the modular sliding fork.

In a possible embodiment according to the invention the fork part is provided from a number of strips of plates. Providing a number strips enables the fork part to be manufactured in effective manner, and the features thereof to be adapted in efficient manner to the expected load to be picked up. It is hereby also possible to provide material at desired locations in order to thereby provide an optimal strength and stiffness to the fork part. The desired functionality and features can here be obtained with a limited amount of material. In addition, a less solid component need be provided here. The fork/fork part can further be manufactured with fewer operations.

The invention further also relates to a method for providing an extendable fork on a fork-lift truck or pallet truck, comprising the step of providing a modular sliding fork according to the invention.

Such a method provides the same effects and advantages as described for the modular sliding fork and/or fork-lift truck or pallet truck.

In a currently preferred embodiment the step of extending and/or shortening the fork comprises of bringing the fork into contact with a ground surface and/or an object, and herein subsequently displacing a fork-lift truck or pallet truck. An effective and efficient extension or shortening of the fork is hereby provided.

BRIEF DESCRIPTION OF THE DRAWINGS

Further advantages, features and details of the invention are elucidated on the basis of preferred embodiments thereof, wherein reference is made to the accompanying drawings, in which.

DESCRIPTION OF THE INVENTION

Figure 1A:
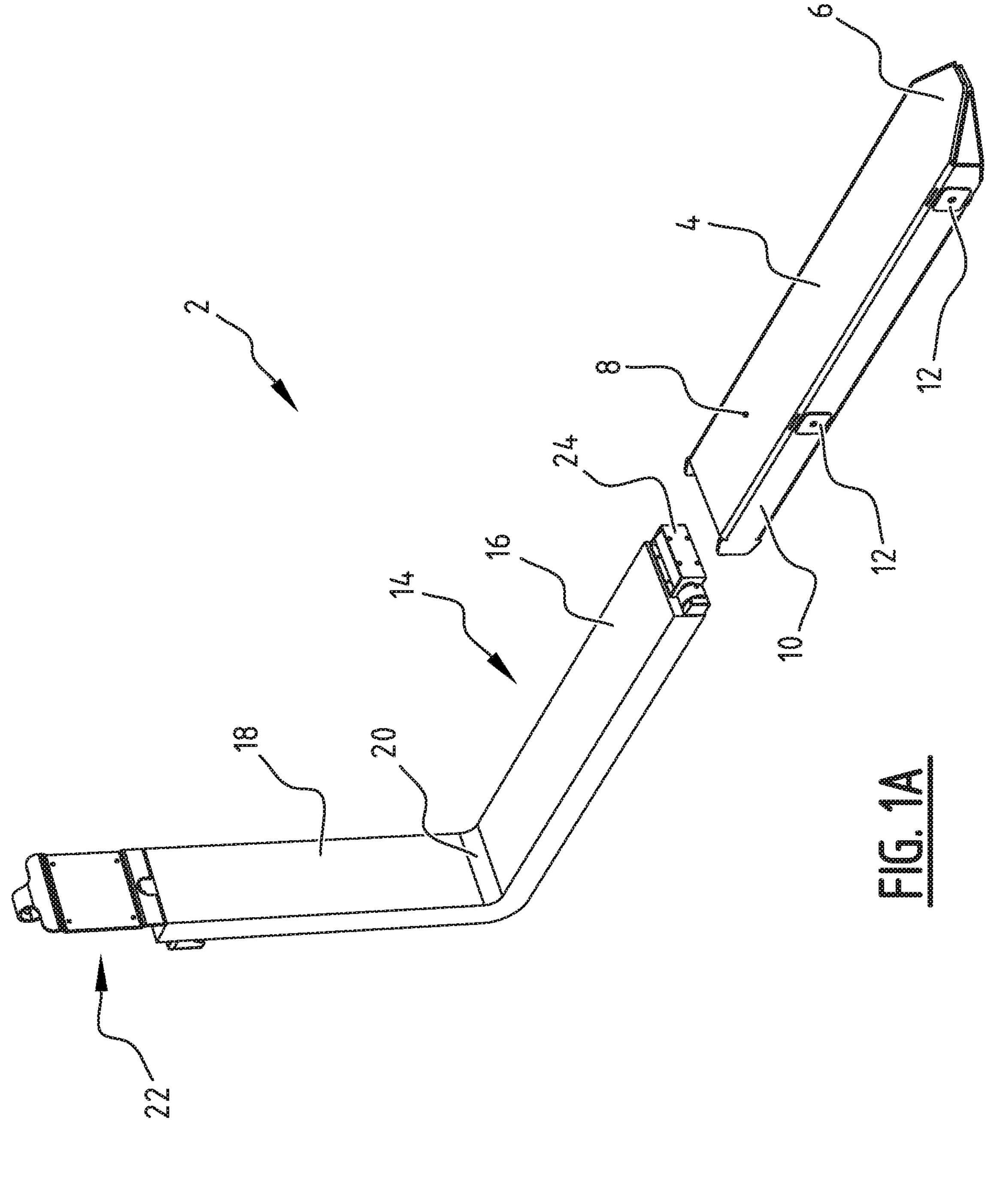
FIG. 1A-D show views of the modular sliding fork in a first embodiment according to the invention.
Figure 1B:
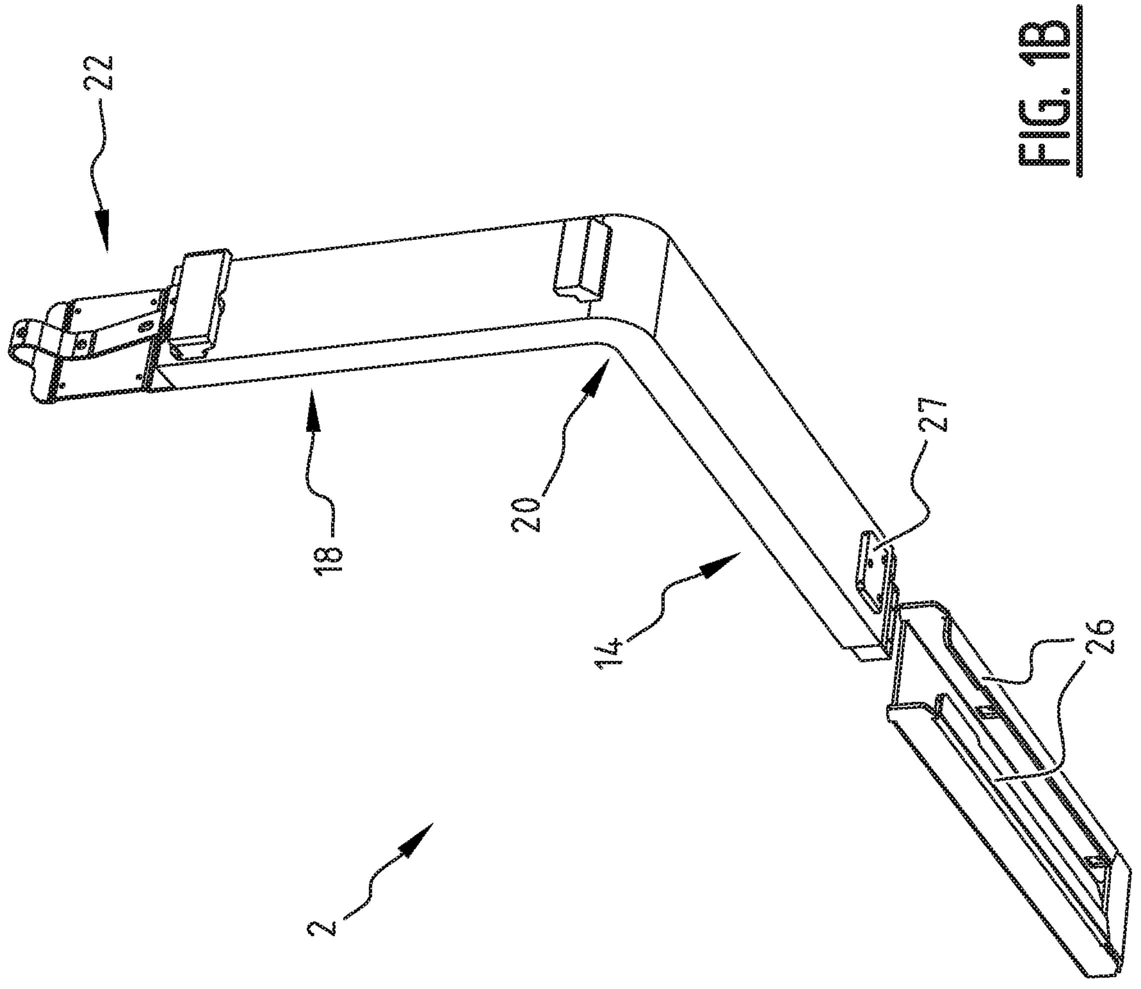
Figure 1C:
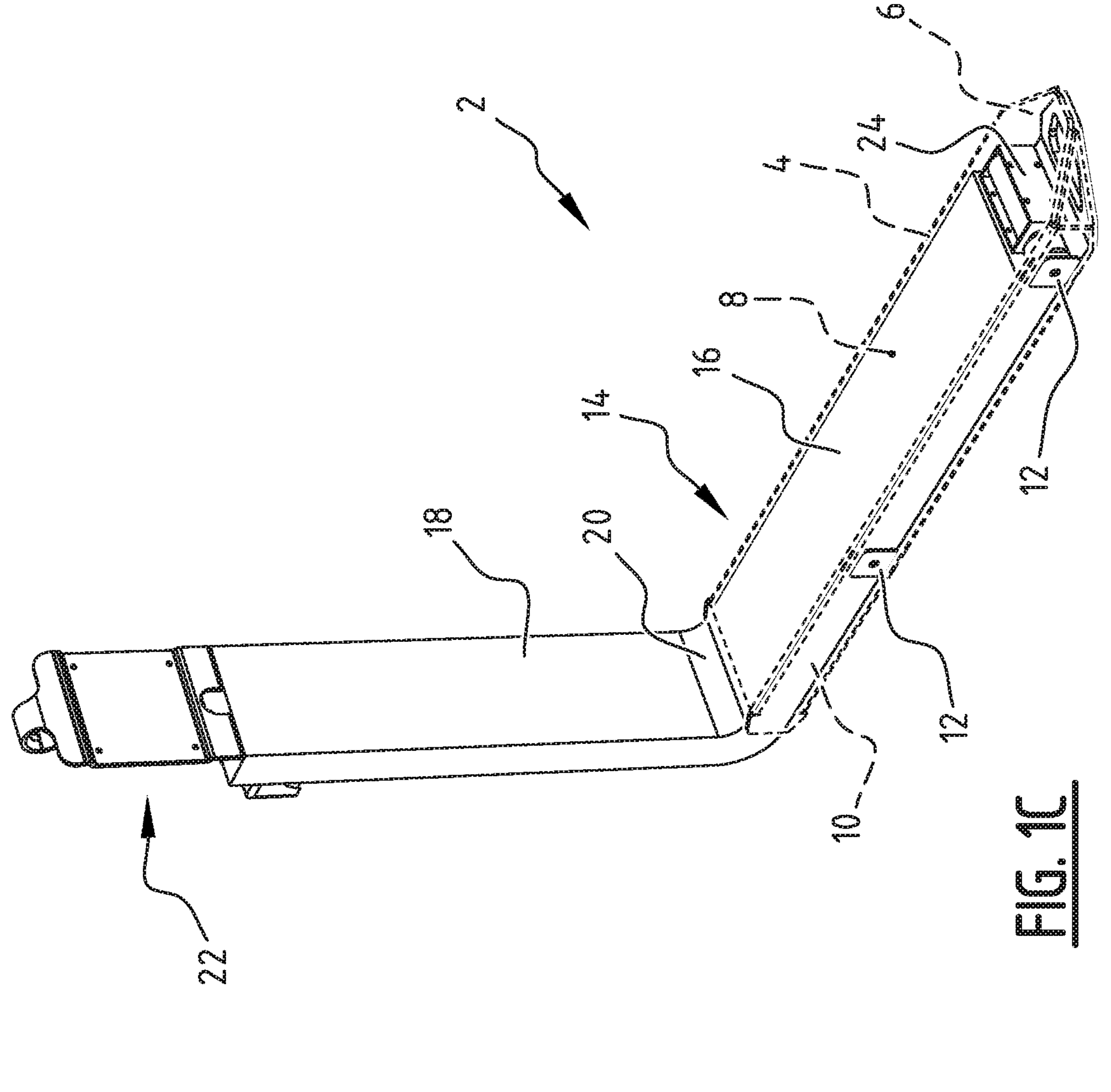
Figure 1D:
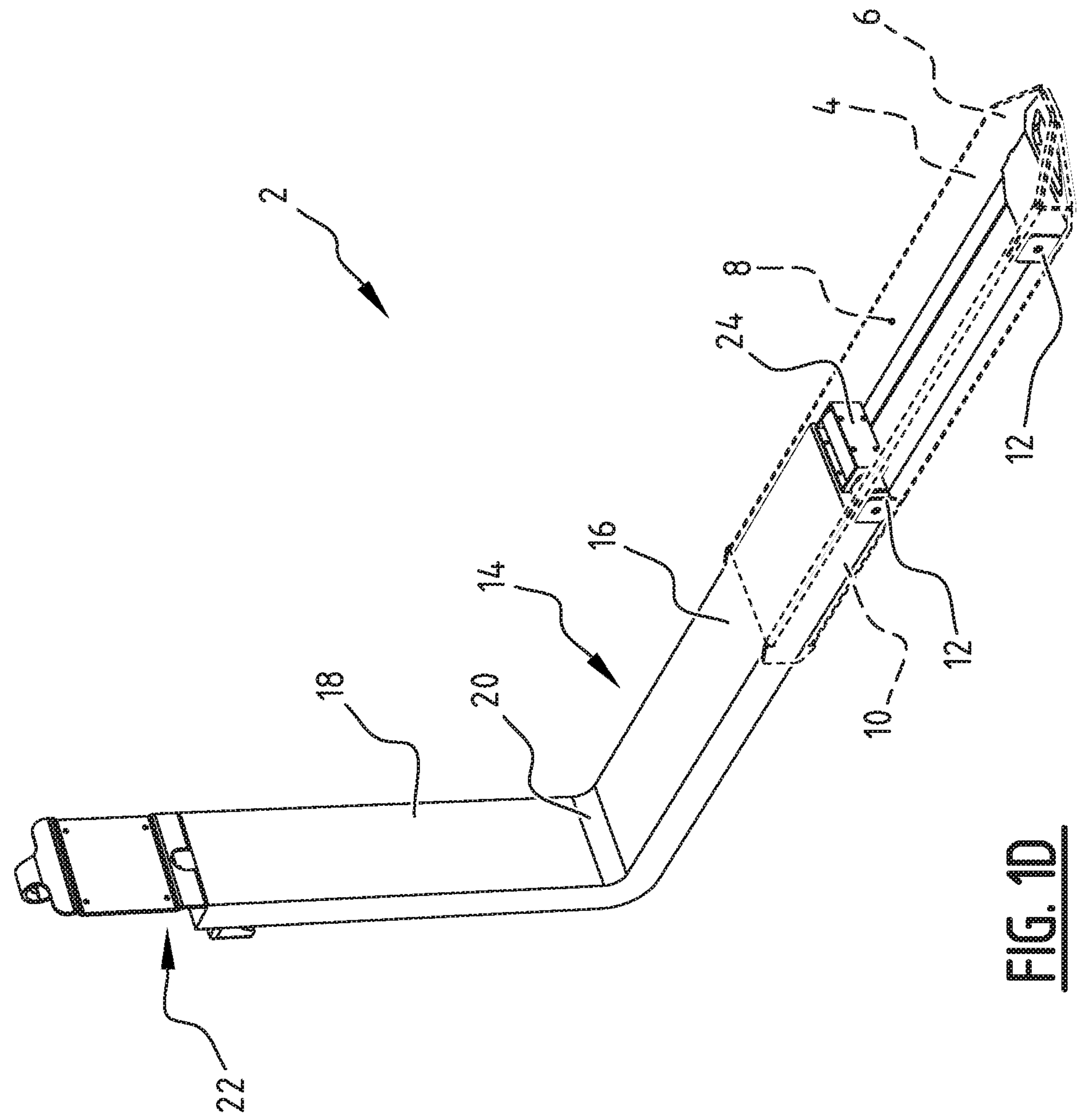

Fork 2 (FIG. 1A-D) is provided with modular sliding fork 4. Sliding fork 4 has nose 6, carrying surface 8 and sides 10. In the shown embodiment a number of locking openings 12 are arranged on sides 10. It will be apparent that more openings and/or openings at different positions can also be provided according to the invention. Fixed fork part 14 is provided with a part 16 which is substantially horizontal in use and a part 18 which is substantially vertical, which are mutually connected at the position of bend 20. Couplings or hooks 22 for instance make fixed fork part 14 connectable to a fork-lift truck. Further provided in the shown embodiment is locking mechanism 24 with a pawl which engages on opening 12. Also provided is friction block 26. In the shown embodiment friction block 26 is embodied as two friction strips. Further provided is stop 27.

In the shown embodiment friction block 26 is embodied such that when forks 2 are set down on a ground surface, friction block 26 likewise rests on the ground surface. By then moving forks 2, for instance by moving a fork-lift truck provided with forks 2, a relative movement between sliding fork 4 and fork part 14 will occur as a result of the occurring friction. An extension or shortening of fork 2 can hereby be realized in effective manner. It will be apparent that locking mechanism 24 is not active during the extending or shortening, and is activated when the desired position of sliding fork 4 relative to fork part 14 is reached so as to bring about a mutual fixation.

Fork 32 (FIG. 2A-E) shows an alternative modular sliding fork 34 according to the invention, provided with nose 36, carrying surface 38 and sides 40, in which openings 42 are provided. Fixed fork part 44 is provided with horizontal part 46, vertical part 48 and transition part 50. Further provided are hooks 52. Locking mechanism 54 is also arranged in this embodiment.

Fork 32 is provided with roller drive 56. A number of rollers or wheels 58 is here arranged in recess 59 in fork part 44. Roller 58 is operatively connected to toothed wheel 60 whereby toothed wheels 62 with belt, cable or chain 64 can be set into motion. Sliding fork 34 is displaced relative to fixed fork part 44 using belt 64. If desired, use can be made here of a cam, pawl, toothing and/or another suitable coupling between sliding fork 34 and fixed fork part 44.

In the shown embodiment roller drive 56 is embodied such that when forks 32 are set down on a ground surface and fork 32 is then moved forward (for instance by the fork-lift truck travelling forward), sliding fork 34 is likewise moved forward. Owing to the transmission of toothed wheels 60, 62, a small movement of a fork-lift truck can optionally result in a greater displacement of sliding fork 34 relative to fork part 44. It will be apparent that locking mechanism 54 is not active during the extending or shortening, and will be activated when the desired position of sliding fork 34 relative to fork part 44 is reached so as to bring about a mutual fixation.

Figure 3:
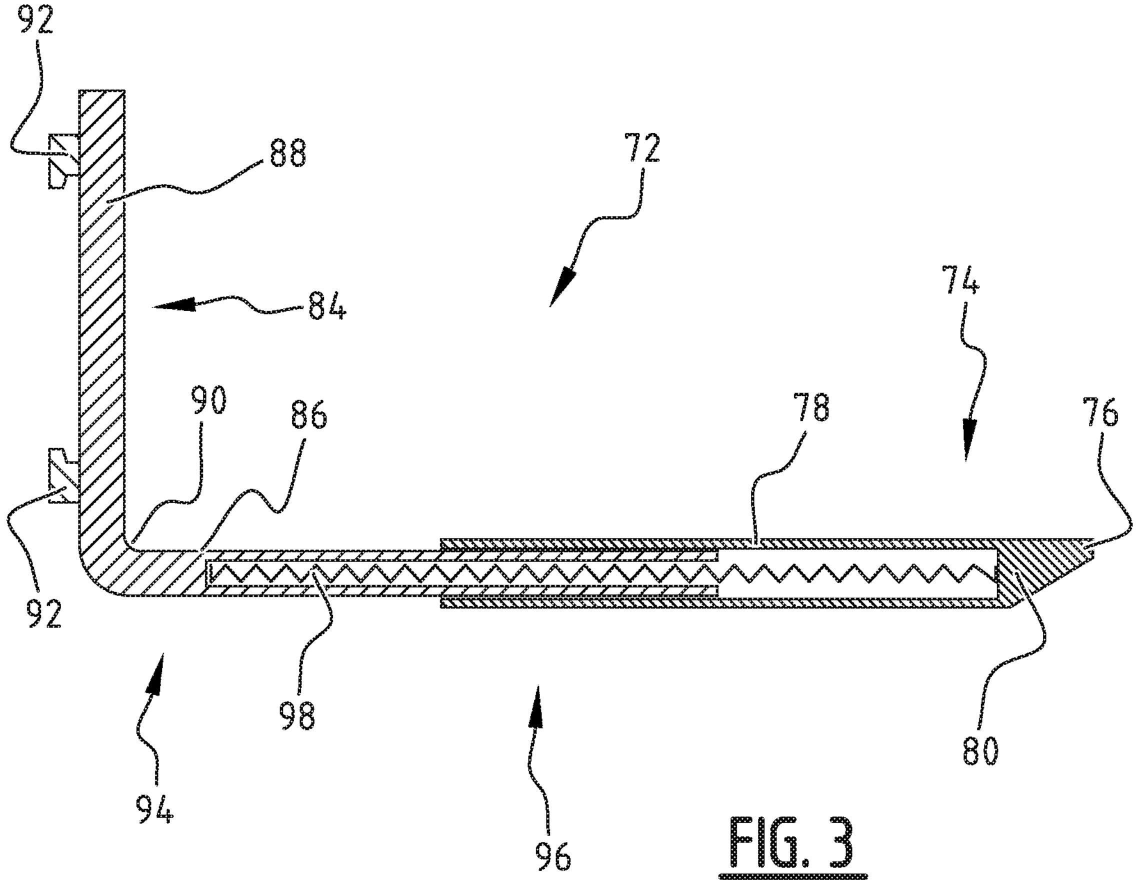
FIG. 3 shows a view of a third embodiment of the modular sliding fork according to the invention.

In an alternative embodiment fork 72 (FIG. 3) is provided with modular sliding fork 74 provided with nose 76, carrying surface 78 and sides 80. Fixed fork part 84 is provided with horizontal part 86, vertical part 88 and transition part 90. Further provided are hooks 92. A locking mechanism is preferably also arranged in this embodiment, as is drive 94 for extension/shortening of fork 72.

Extension of fork 72 is brought about by the use of energy storage system 96, for instance comprising spring 98, gas spring, hydraulic accumulator and so on, and the opposite movement for shortening of fork 72 is for instance provided for by driving the fork-lift truck forks 72 against an object, whereby sliding fork 74 slides in along with the travelling movement of the forks. In the shown embodiment the energy required for extending fork 72 is here also stored in spring 98.

It will be apparent that other embodiments are also possible according to the invention. One of the possible embodiments relates to an alternative embodiment of inner fork/fixed fork part 14, 44, 84. Besides a solid material, part 14, 44, 84 can also be constructed from plate material, wherein a plurality of strips can be provided if desired, for instance at the most loaded positions of fork part 14, 44, 84.

Sliding fork 4, 34, 74 is optionally provided from tubular material which is largely open on the side directed downward during use. This provides easy access for maintenance and checking of for instance locking mechanism 24, 54 and/or other components.

It is further possible to embody locking mechanism 24, 54 in different ways according to the invention. It is thus for instance possible to embody a drive of the locking mechanism with a so-called solenoid (optionally with spring return) and/or hydraulically, pneumatically, mechanically or a combination thereof. At diverse positions with openings 12, 42, 72 a locking pin for instance can fixate the parts of fork 2, 32, 72 relative to each other, or conversely release them, for extension/shortening. If desired, the locking pin can here be given a self-releasing form, for instance by providing the locking pin with a (slightly) conical outer end. As addition to or as alternative to a pawl with openings 12, 42, the locking can according to the invention also be embodied in different ways. The fixation at a relatively large number of positions can thus for instance be enabled with a type of toothing via a type of gear rack. An (electrical) locking can for instance be realized by having a pin or shaft move, using a coil, between a locked and unlocked state, optionally with a spring action, as stated above for the solenoid embodiment. For control of locking mechanism 24, 54 use can optionally be made of a remote control, for instance via Bluetooth connection, and battery.

Figure 2A:
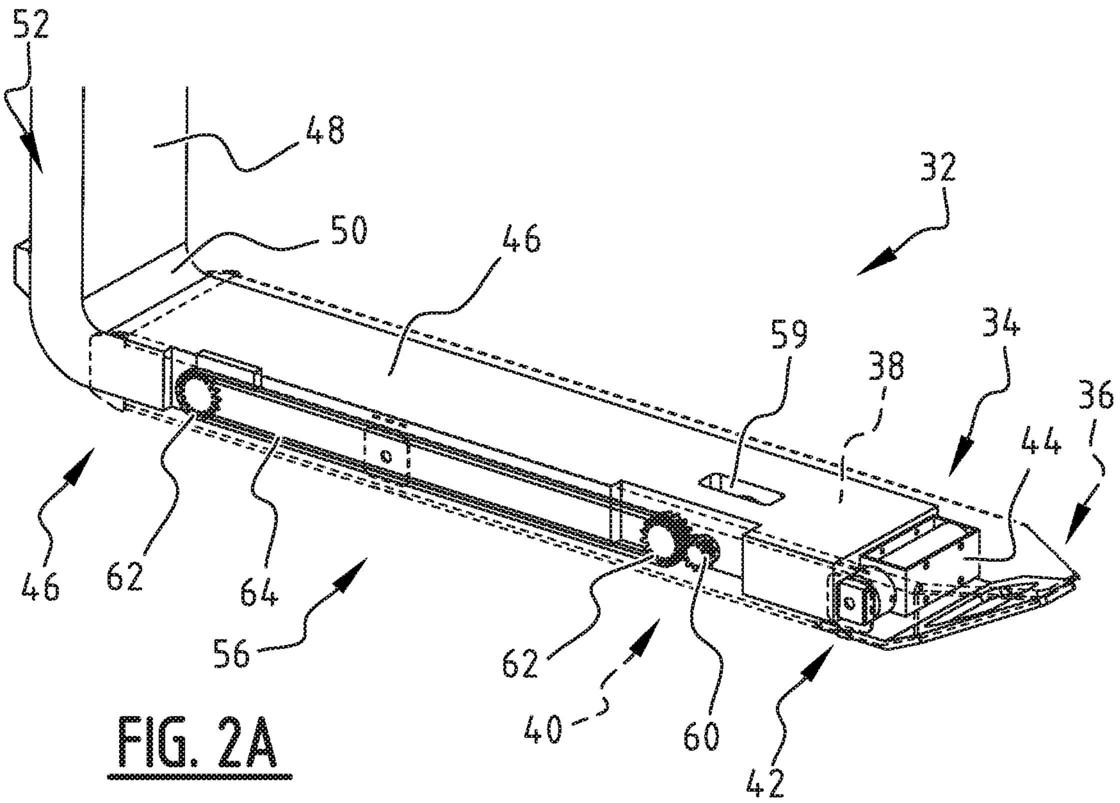
FIG. 2A-E show a view of a second embodiment of the modular sliding fork according to the invention.
Figure 2B:
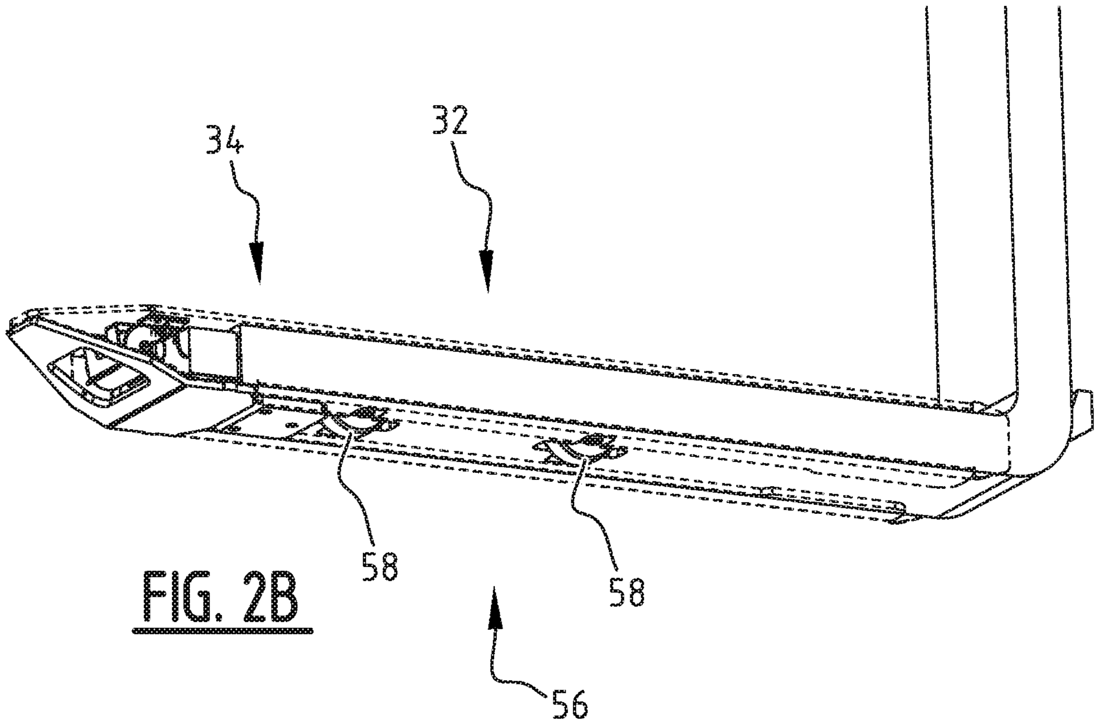
Figure 2C:
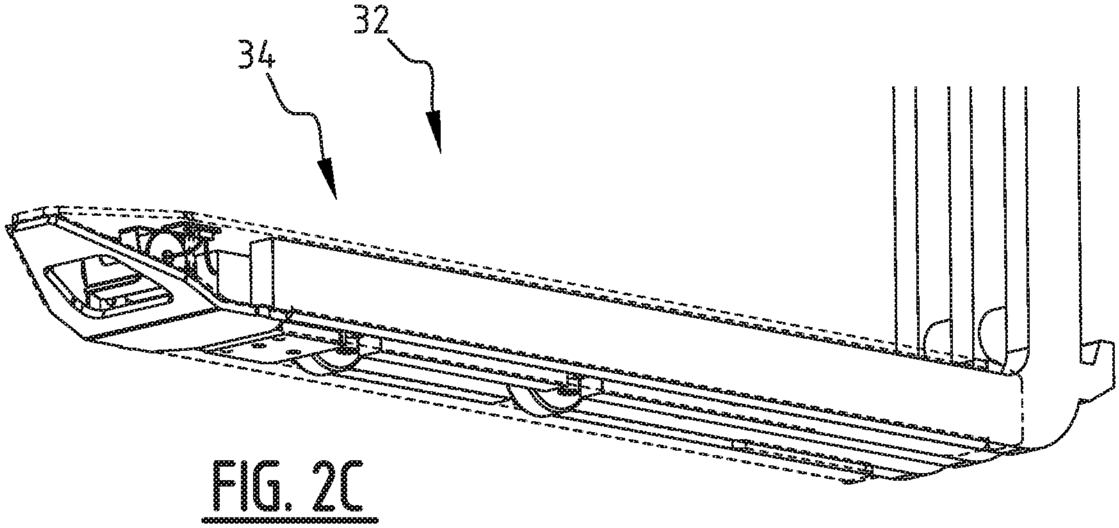
Figure 2D:
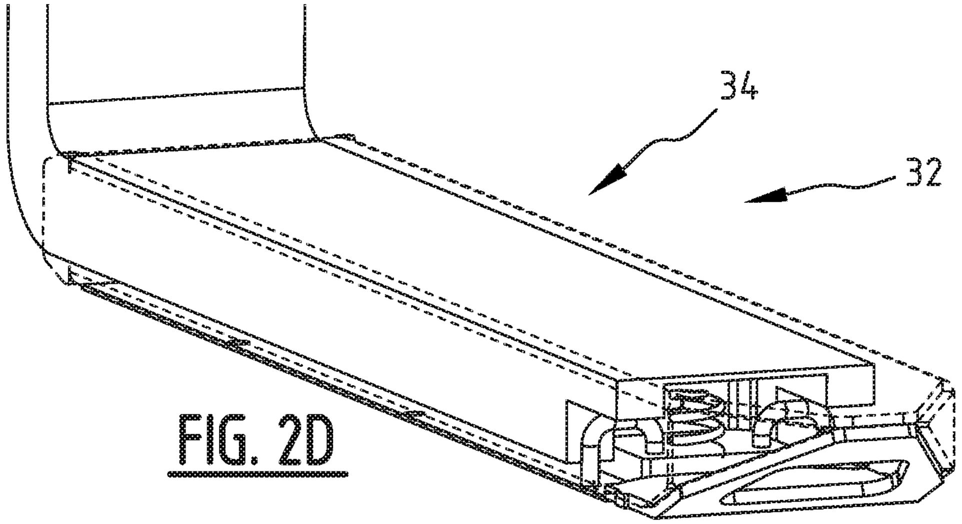
Figure 2E:
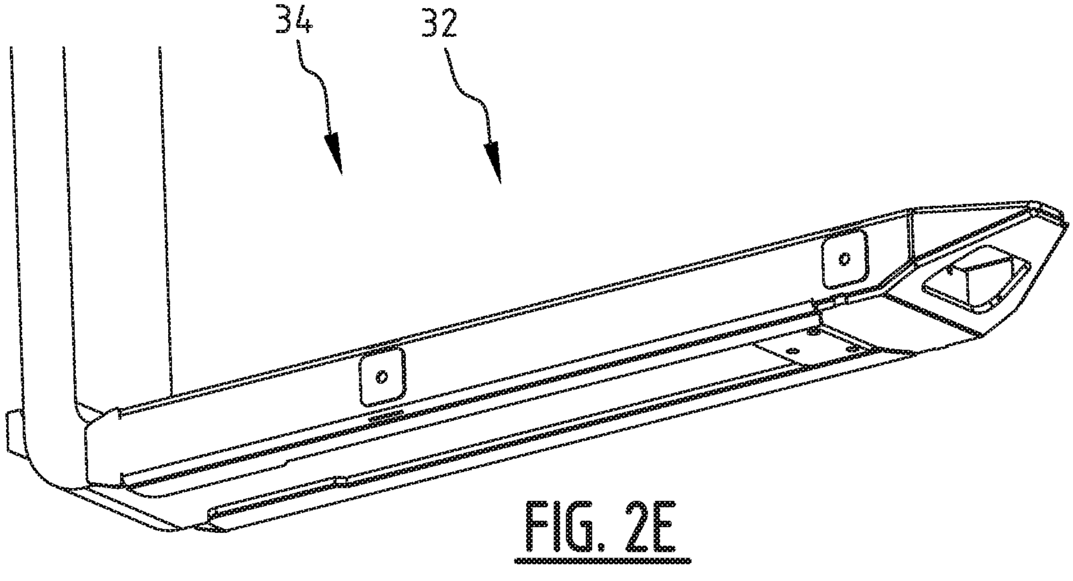
Figure 4:
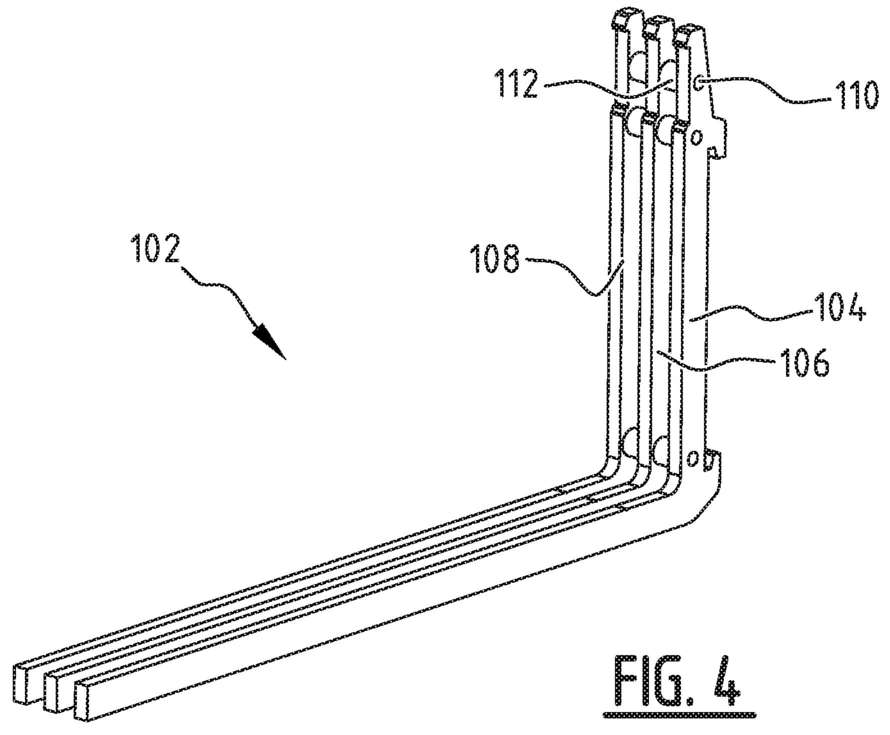
FIG. 4 shows a view of a fourth embodiment of the modular sliding fork according to the invention.

In a further alternative embodiment plate-like fork part 102 (FIG. 4) is provided from a number of strips 104, 106, 108. It will be apparent that a different number of strips can also be applied according to the invention. Strips 104, 106, 108 are mutually connected with pin-like elements 110 and are held at the desired mutual distance by bushes 112. Advantages of such an embodiment include a weight saving, options for effective local reinforcement, efficient production. Fork part 102 can be applied in the different embodiments. This is for instance already visible in fork 32 (FIG. 2C).

Figure 5A:
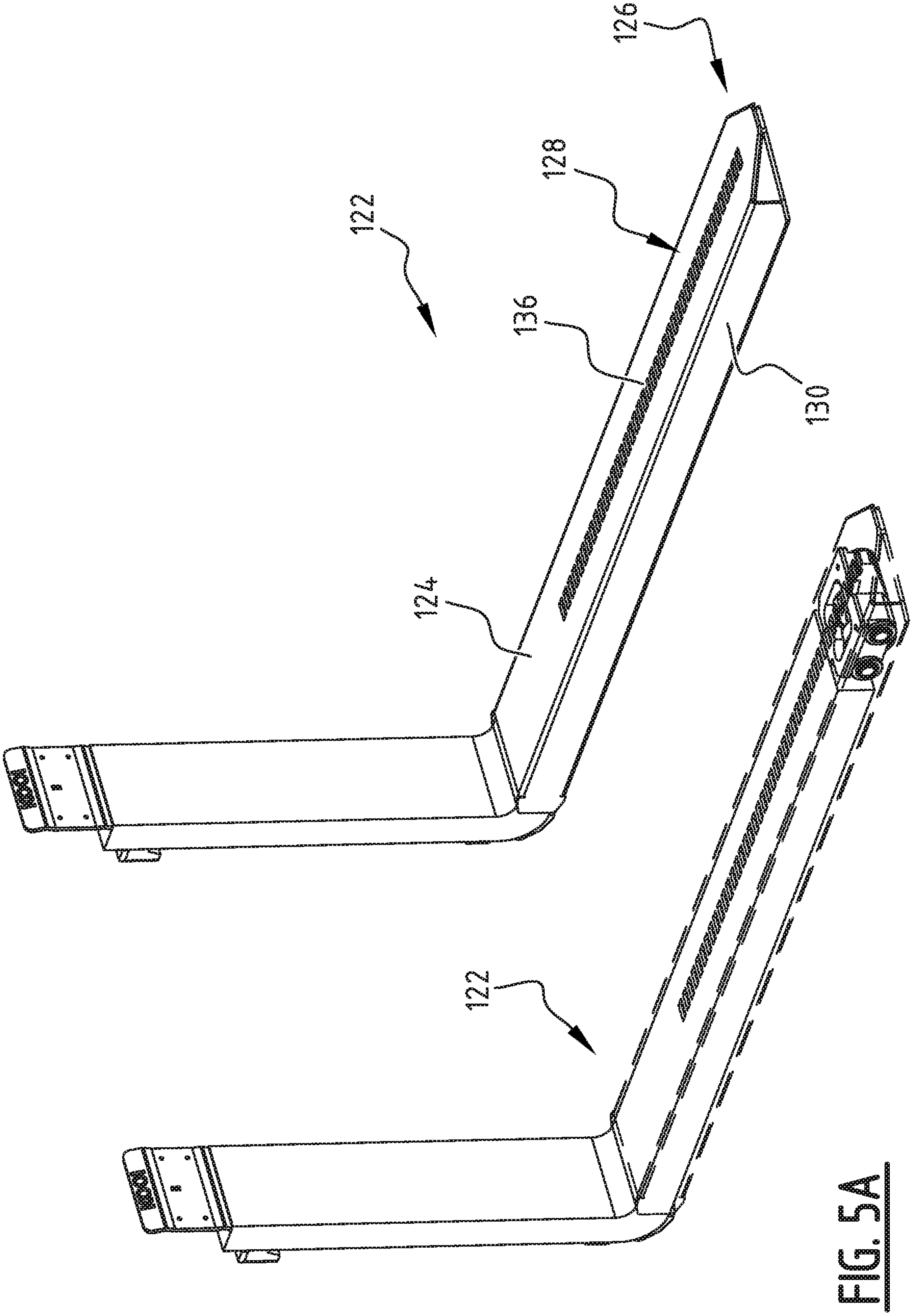
FIG. 5A-B show a view of a fifth embodiment of the modular sliding fork according to the invention.
Figure 5B:
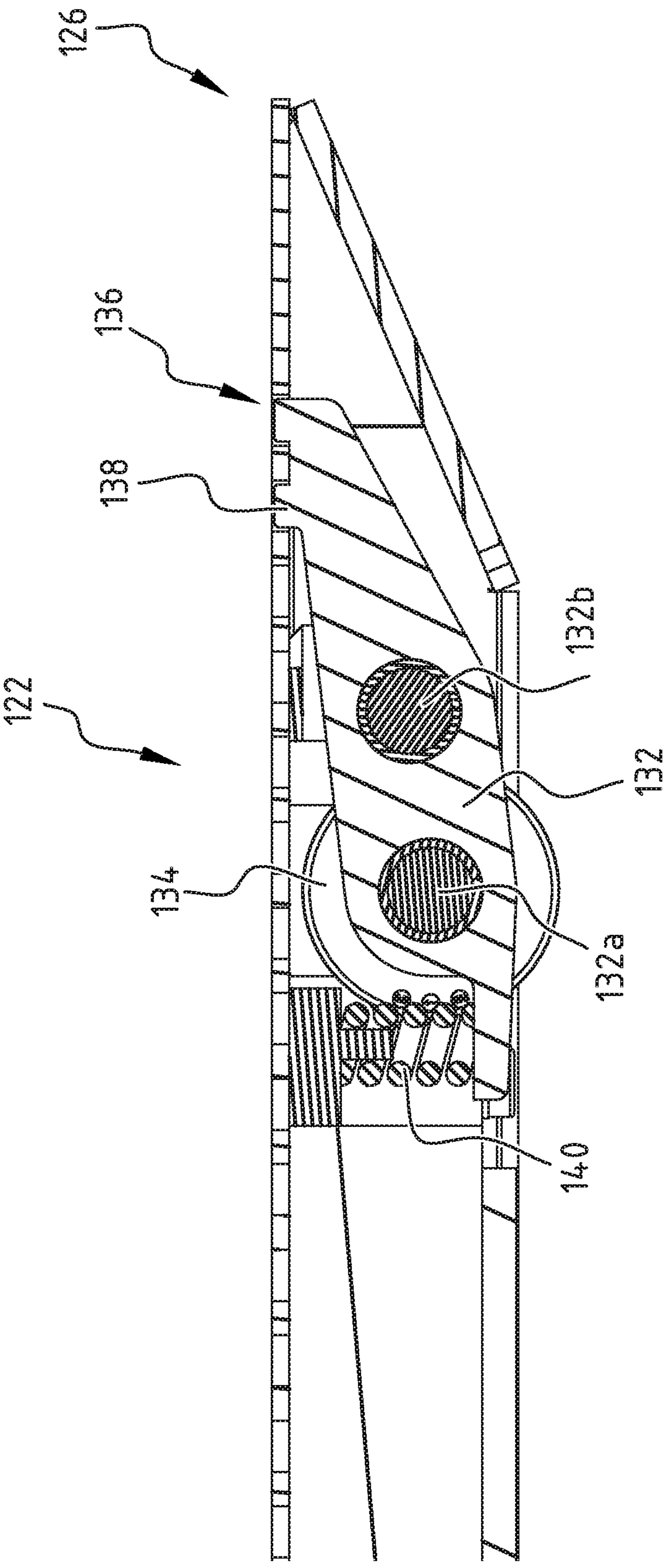

In a fifth alternative embodiment fork 122 (FIG. 5A-B) is provided with alternative modular sliding fork 124 provided with nose 126, carrying surface 128 and sides 130. Fork 122 comprises locking plate 132 with rollers 134 which locks outer fork 124 via openings/recesses 136 on the upper side of sliding fork 124 using locking elements 138. By placing fork 122 on a ground surface and/or inclining the fork-lift truck forward, rollers 134 at or close to nose 126 are pressed upward, via connection 132*a* and plate 132, counter to the action of spring 140. The locking of plate 132 and elements 138 thereby moves downward by movement around element 132*b*, after which sliding fork 124 is free to move.

During use rollers 134 as it were lift sliding fork 124 on the inner side during unlocking, and when a fork-lift truck with forks 122 for instance travels forward or rearward in this position, sliding fork 124 with the tube is driven forward or rearward with friction by rollers 134.

Figure 6A:
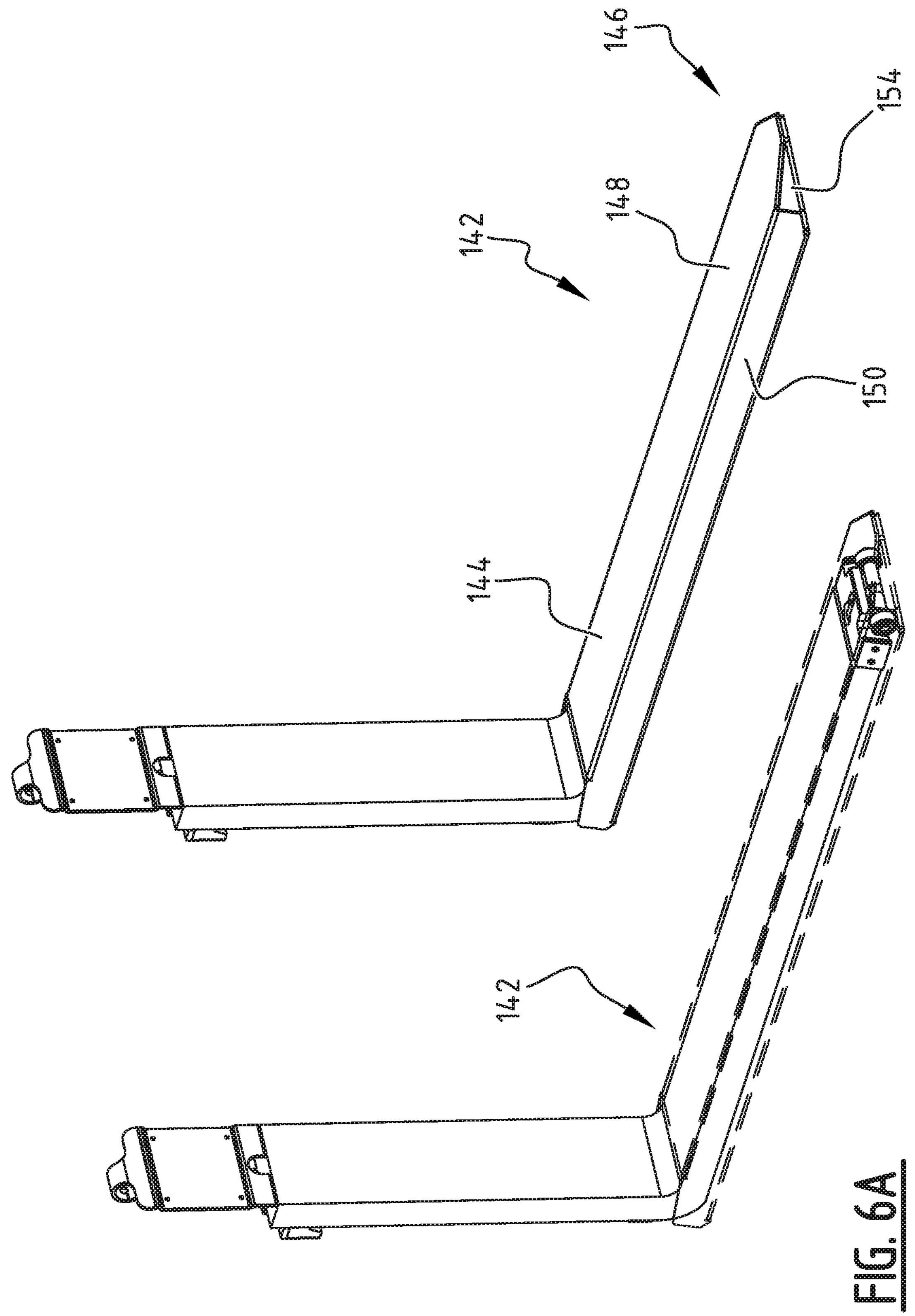
FIG. 6A-C show a view of a sixth embodiment of the modular sliding fork according to the invention.
Figure 6B:
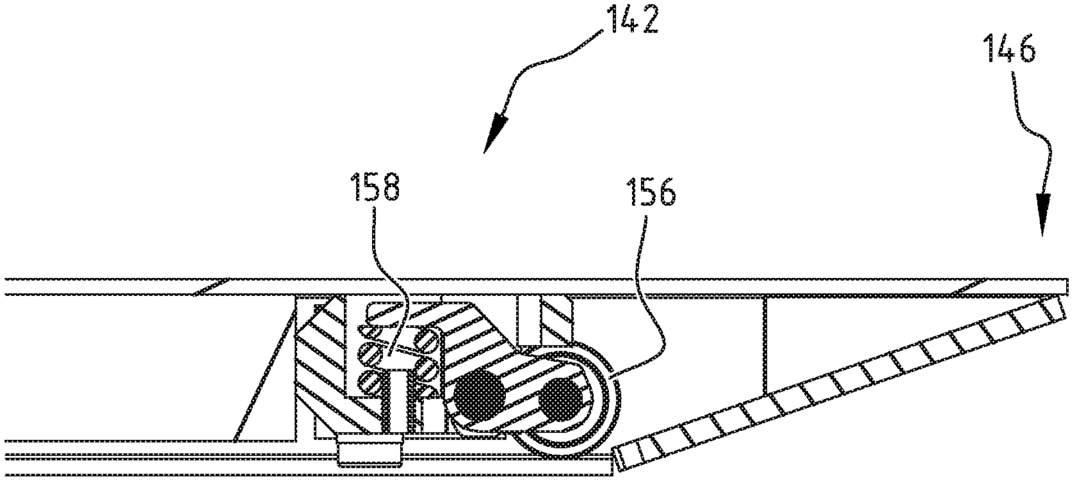
Figure 6C:
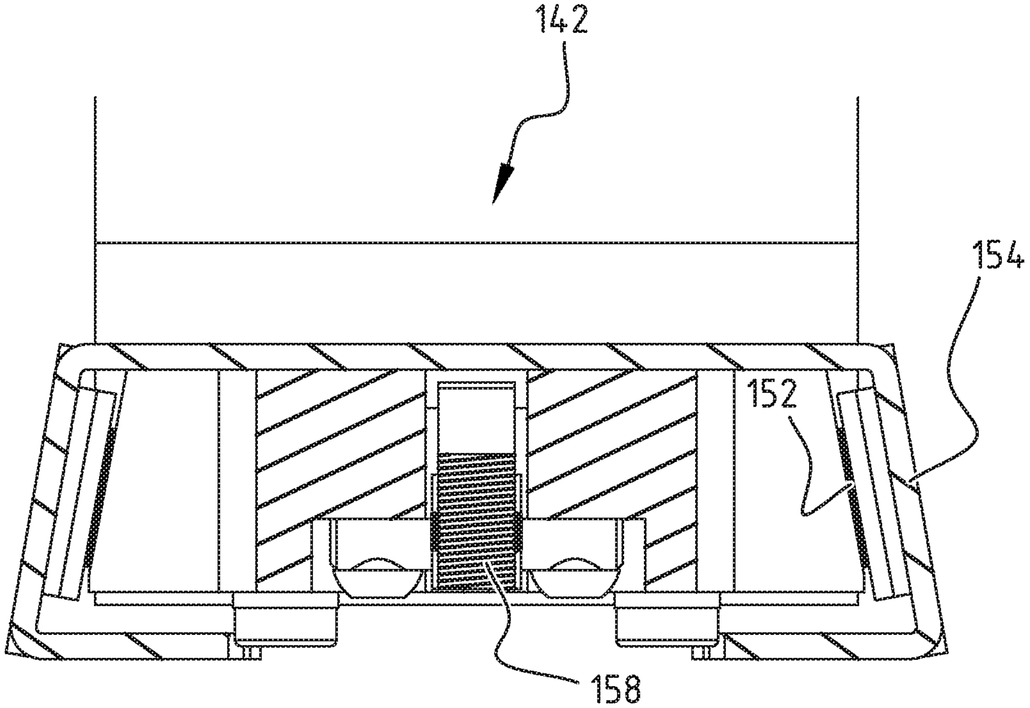

A sixth alternative embodiment shows fork 142 (FIG. 6A-C) provided with alternative modular sliding fork 144 provided with nose 146, carrying surface 148 and sides 150. Obliquely placed friction elements or pads 152 on the front side 146 of fork 142 provide, preferably in co-action with oblique side walls 154 of outer fork/sliding fork 144, for sufficient friction to hold outer fork 144 in place. Rollers 156 on the front side of fork 152 press outer fork 144 downward relative to fork 142 with spring 158. When outer fork 144 is pressed onto the ground during use, for instance with a fork-lift truck, side walls 154 come away from friction pads 152. By then moving the fork-lift truck forward or rearward, wherein outer fork 144 remains in place owing to friction with the ground surface, the inner part of fork 142 can be moved into or out of outer fork 144. Rollers 156 on the front side of the inner fork reduce the friction between inner and outer fork.

Figures 7A, 7B:
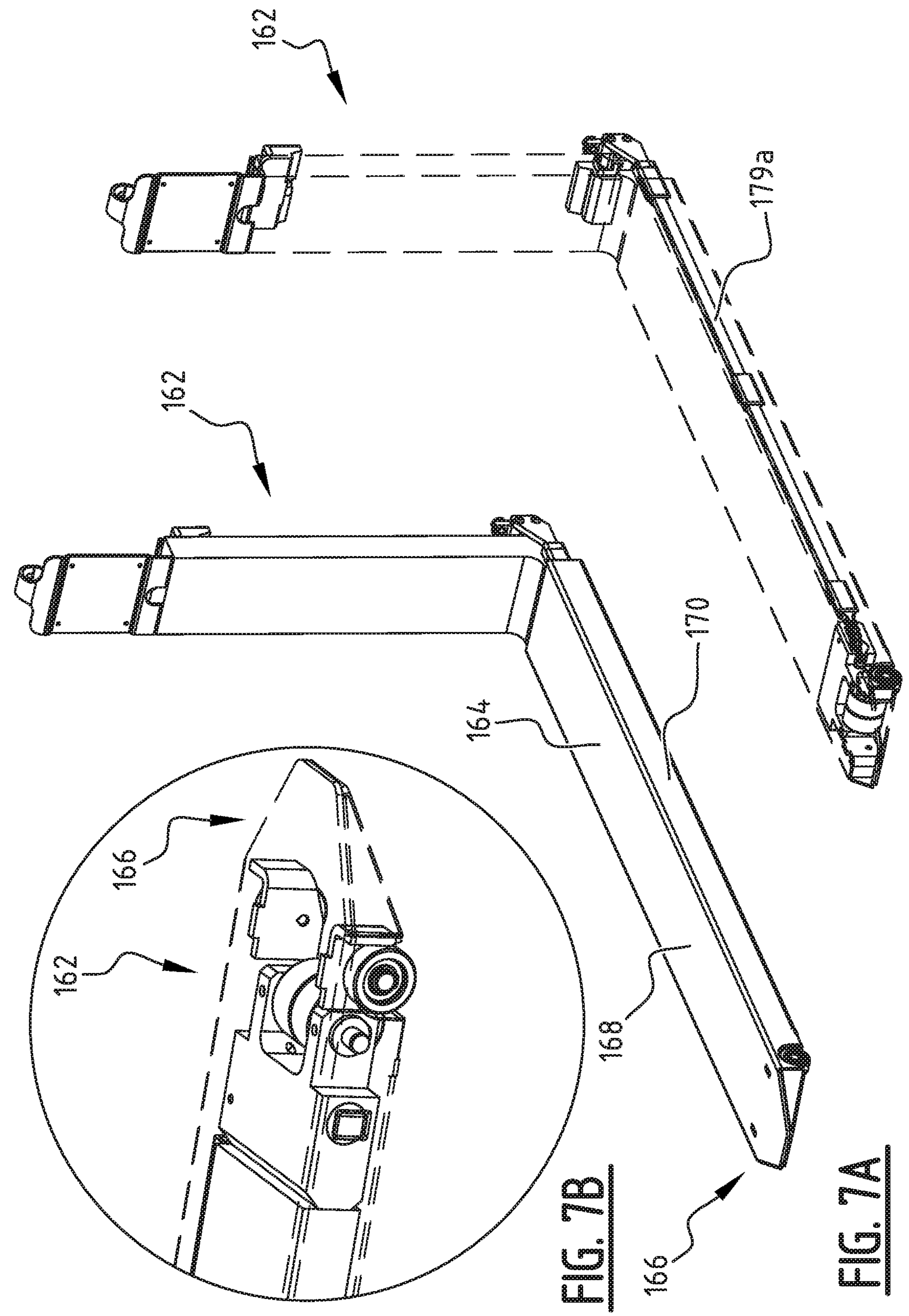
FIG. 7A-C show a view of a seventh embodiment of the modular sliding fork according to the invention.
Figure 7C:
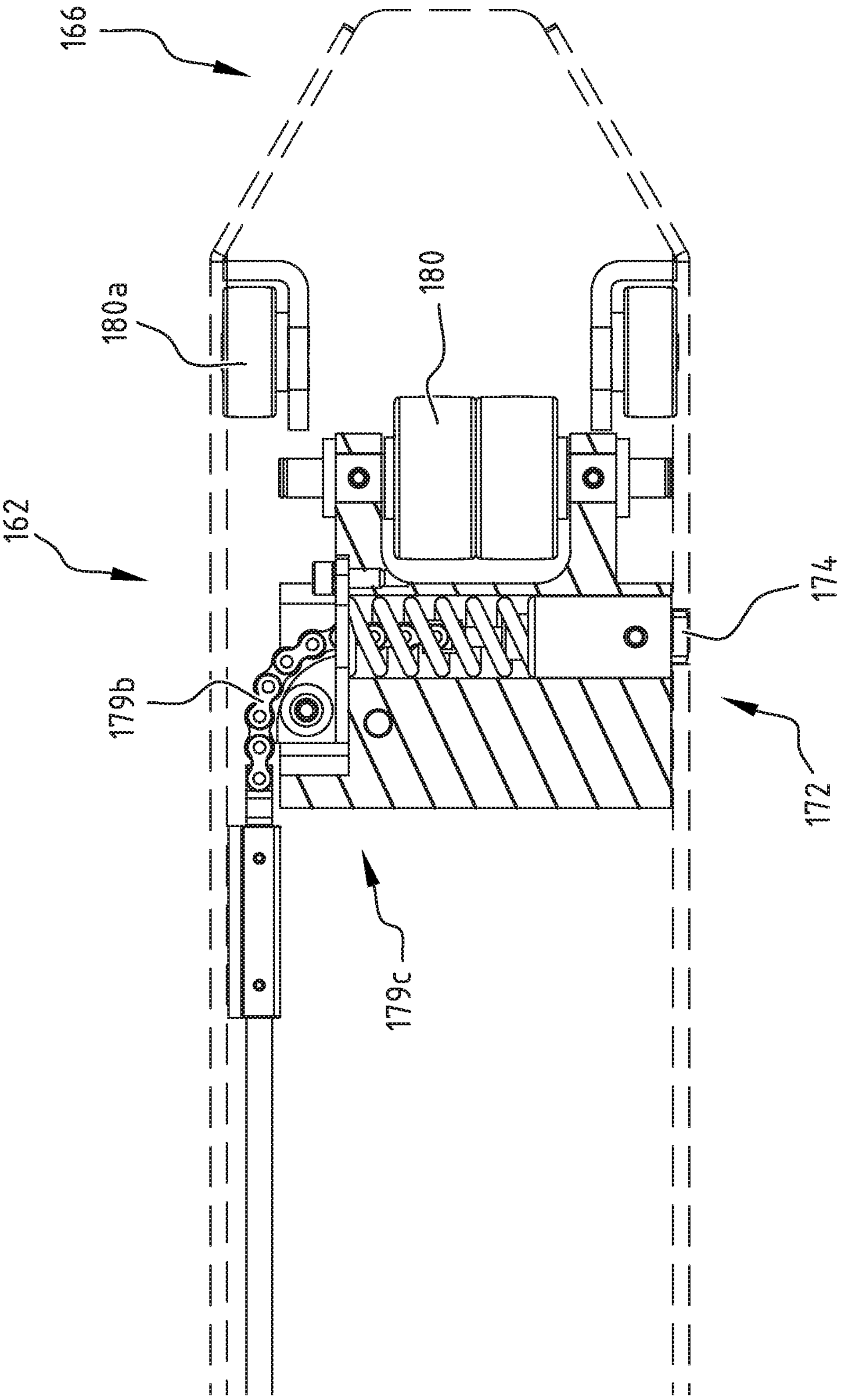

A seventh alternative embodiment shows fork 162 (FIG. 7A-C) provided with alternative modular sliding fork 164 provided with nose 166, carrying surface 168 and sides 170. Provided in and/or through bore 172 of sliding fork/outer fork 164 is a locking pin 174 which is placed transversely of the slide-in/slide-out direction and which falls from the inner fork into openings/recesses 176 in the outer fork. Pin 174 is kept in locked state via spring 178. When fork 162 is placed with nose 166 on the ground and inclined forward with for instance a fork-lift truck during use, the fork board of the fork-lift truck pulls on pull rod 179*a* situated on side 170 of the fork part (inner fork). Pull rod 179*a* pulls on chain 179*b*, which pulls on locking pin 174 via corner guide 179*c*. Outer fork 164 hereby unlocks.

In the shown embodiment two rollers 180 are provided on the front side in the inner fork, these functioning in a similar manner as rollers 134 in FIG. 5. Rollers 180 drive the outer fork with friction. Additional (small) rollers 180*a* in the front side of the outer fork prevent additional friction on the ground surface during sliding in/out. Such friction is caused in that the fork is tilted forward at a small angle (inclining of fork-lift truck) and the outer fork thereby has a tendency to scrape over the ground surface.

If desired, rollers 180 can optionally be removed and replaced by for instance two small shaft stubs (not shown) on which additional/small rollers 180*a* from the outer fork can be mounted. In this configuration the sliding in/out is performed in similar manner as discussed for fork 142.

Figures 8A, 8B:
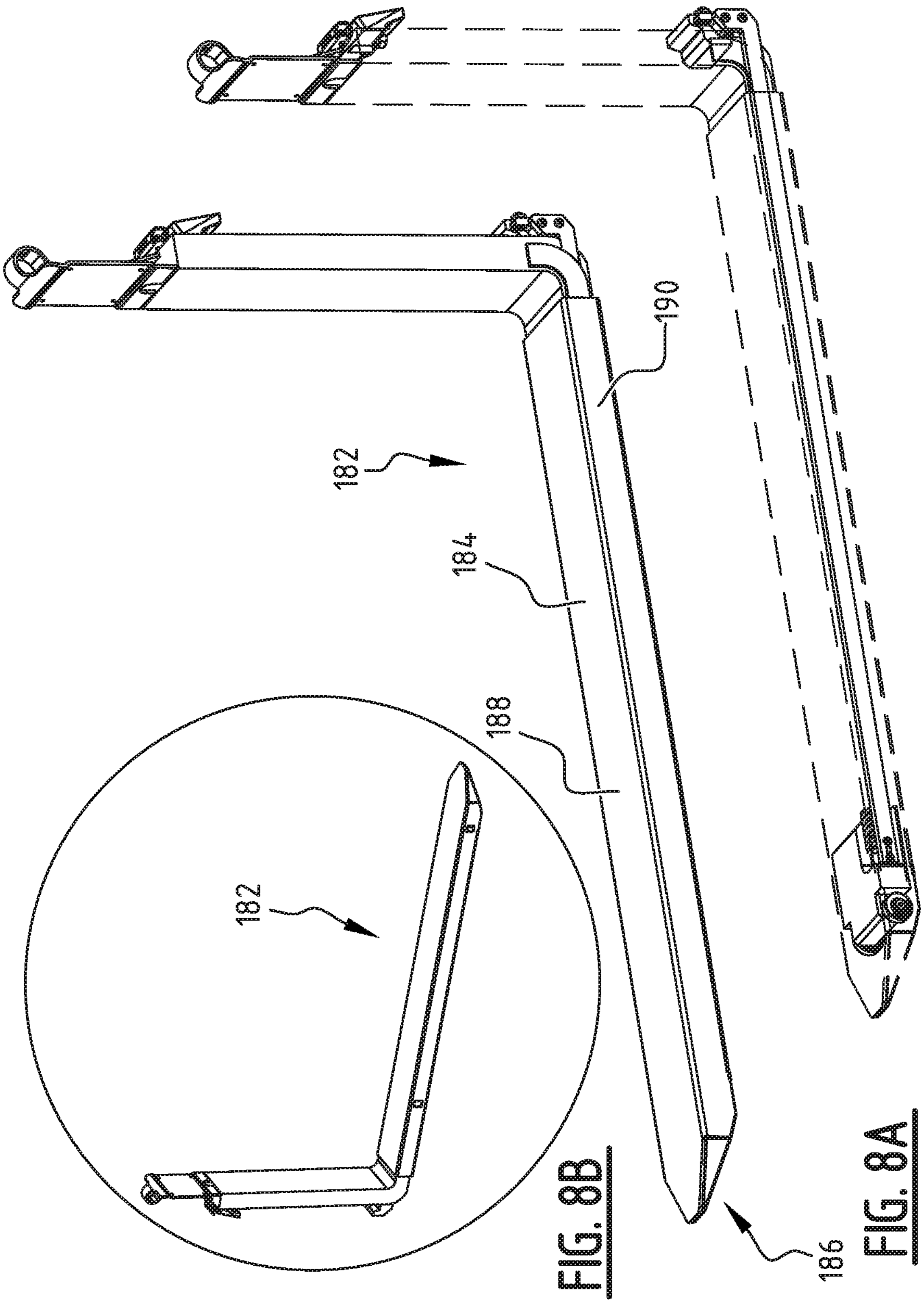
FIG. 8A-C show a view of an eighth embodiment of the modular sliding fork according to the invention.
Figure 8C:
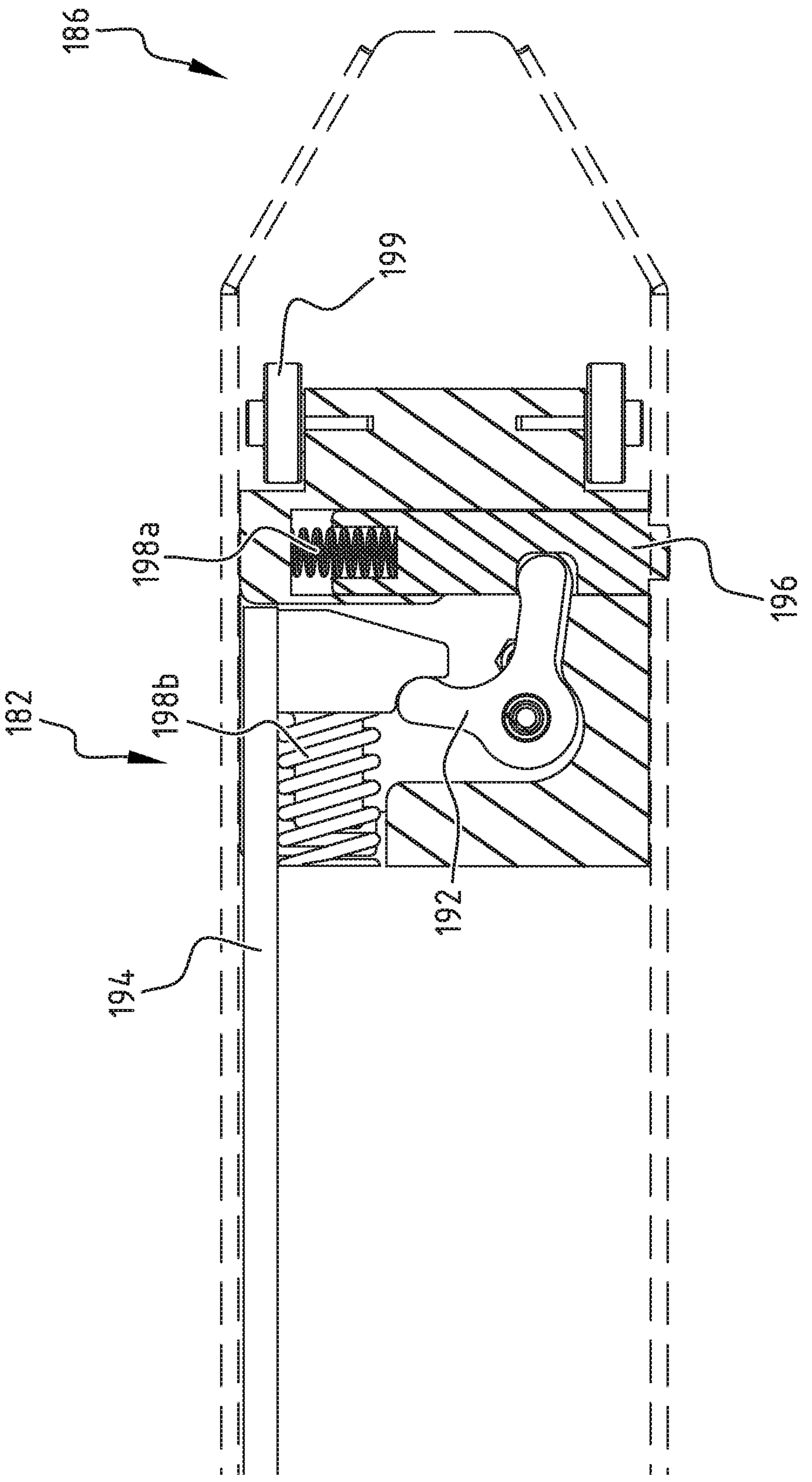

An eighth alternative embodiment shows fork 182 (FIG. 8A-C) provided with alternative modular sliding fork 184 provided with nose 186, carrying surface 188 and sides 190. The operation of fork 182 is similar to that of fork 162. Provided instead of chain 179*b* is (horizontal) tilting mechanism 192, which is placed in the front of the inner fork. Mechanism 192 is operatively connected to pull rod 194, locking pin 196, spring 198*a* which keeps pin 196 extended, and spring 198*b* which pushes pull rod 194 against the fork board. Two rollers 199 are provided on the inner fork and provide for the same function for the sliding in and out of fork 182 as discussed and shown for fork 162.

Figure 9:
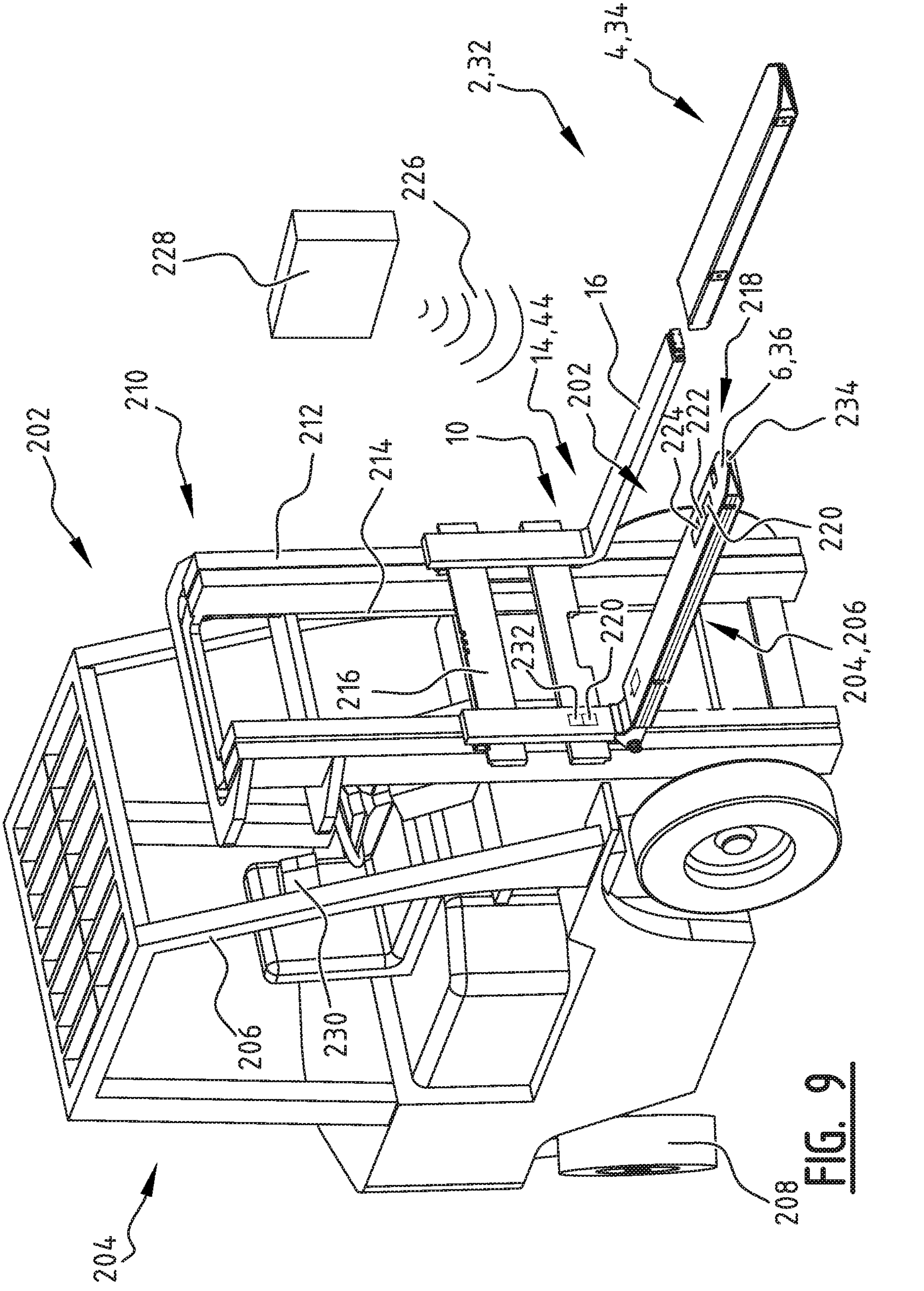
FIG. 9 shows a fork-lift truck provided with a modular sliding fork according to the invention.

Fork-lift truck 202 (FIG. 9) is provided with cab 204, frame 206 and wheels 208, mast construction 210 with construction 212 provided with guides 214 in which or on which fork board 216 is arranged. Arranged on fork board 216 in the shown embodiments are forks 2, 32, 72 provided with respective modular sliding forks 4, 34, 74 and fixed fork parts 14, 44, 84. It will be apparent that forks 122, 142, 162 and/or 182 can also be arranged hereon. The following therefore likewise applies to these embodiments.

Also provided in the shown embodiment is sensor system 218 comprising possible sensors in sensor part 220, sensor receiver 222 and power supply battery 224. Sensors 220 are for instance one or more of an inclinometer, strain gauges, cable transducer, laser, ultrasonic sensor. Sensors 220 can be aimed at measuring an occurring load, fork length, position relative to a ground surface and the like. It will also be apparent that parts or the whole sensor system 218 can be arranged at a different location or distributed over multiple locations. Strain gauges will thus for instance preferably be arranged in or on a vertical part of forks 2, 32, 72. Fork-lift truck 202 can optionally communicate via signals 226 with (external) control system 228, for instance an ERP system. Arranged in cab 204 in the shown embodiment is control box or interface 230, whereby a user or driver is informed of for instance the correct operation of the locking mechanism and/or can carry out control of the modular sliding fork. A further sensor 232 can be provided on fork part 14, 44, 84, as can an optional laser pointer 234 close to nose 6, 36, 76.

In the shown embodiment a driver of fork-lift truck 202 can activate and/or deactivate locking mechanism 24, 54 via control box 230. This enables an effective extension/shortening of forks 2, 32, 72. If desired, the control of locking mechanism 24, 54 can be performed in different ways, for instance via a button, handle, app and the like. It is additionally or alternatively also possible that when forks 2, 32, 72 are set down on a ground surface, locking mechanism 24, 54 is automatically deactivated and extension/shortening of forks 2, 32, 72 is possible. When forks 2, 32, 72 are lifted, locking mechanism 24, 54 can then be activated in similar automatic manner. In another embodiment a locking is placed in sliding fork 4, 34, 74 and operated by moving sliding fork 4, 34, 74 against for instance an object, after which a push button or tilting mechanism is used in order to uncouple a locking of locking mechanism 24, 54. Use can additionally or alternatively be made of a sensor 220 for controlling and/or monitoring locking mechanism 24, 54.

The energy supply for the locking mechanism can be provided from fork-lift truck 202. It is additionally or alternatively also possible to make use of battery 224, a separate (rechargeable) battery, an energy storage system wherein energy is stored during for instance the extending/shortening of forks 2, 32, 72, for instance in a spring mechanism, to be used later for the locking and/or another energy supply. If desired, an additional safety system can be provided which fixates sliding fork 4, 34, 74 relative to fork part 14, 44, also if locking mechanism 24, 54 were to fail.

It will be apparent that the diverse described or otherwise cited possibilities and options can be combined into new embodiments according to the invention in different combinations.

Figure 10:
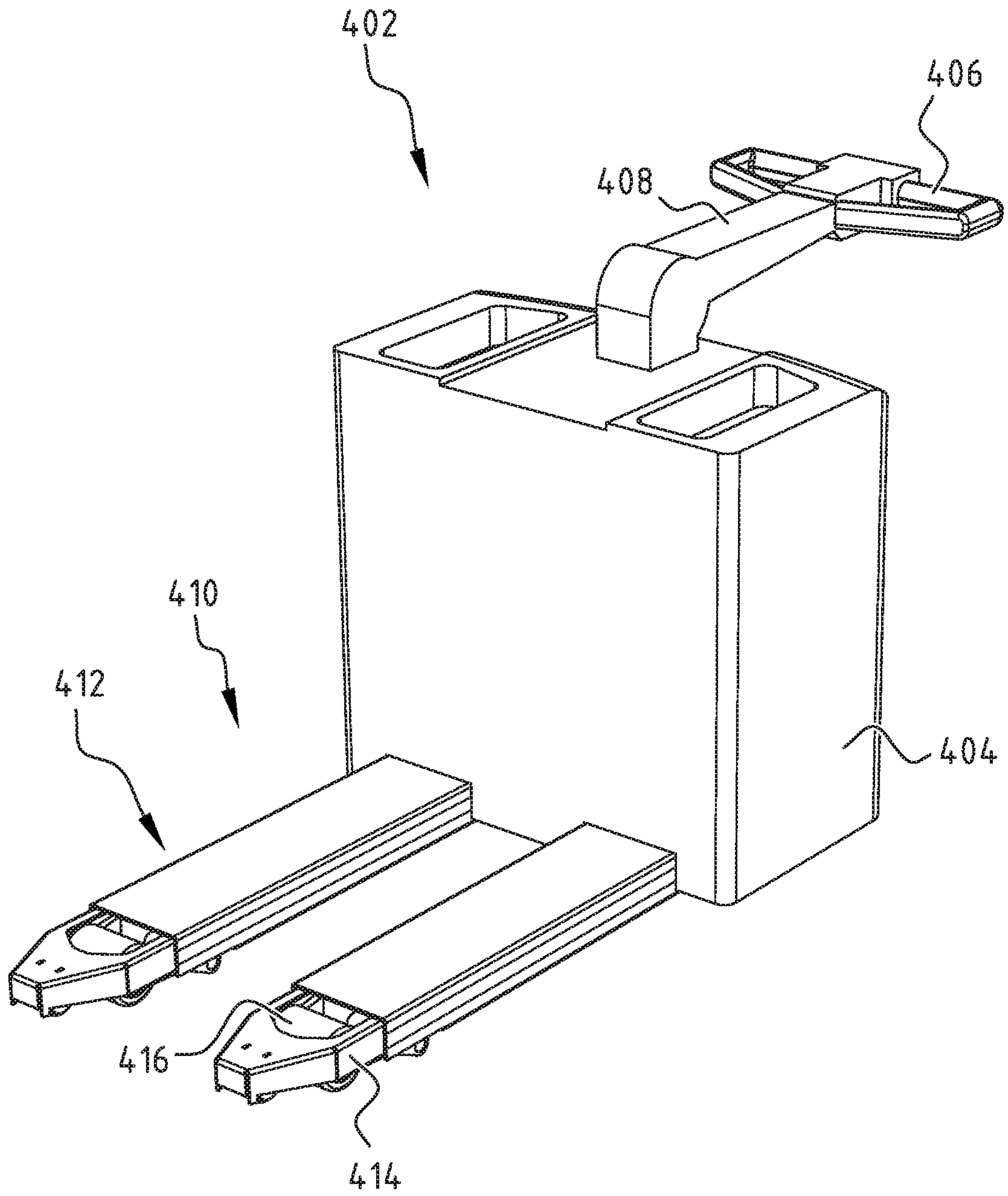
FIG. 10 shows a pallet truck provided with a modular sliding fork according to the invention.

Pallet truck 402 (FIG. 10) is provided with frame 404, handle 406 and arm 408. Further arranged on frame 404 are forks 410 which are based on forks 2, 32, 72 which, in the above stated embodiment, are aimed at application in fork-lift truck 202. In the shown embodiment fixed fork part 412 is provided as outer tube and the extendable part is provided internally therein for sliding as modular sliding fork 414, wherein sliding fork 414 is provided with wheel 416 as is usual for pallet trucks. If desired, it is possible also to apply the diverse options and additions, for instance in respect of sensor systems, described and/or shown for fork-lift truck 202 to pallet truck 402. Extension of fork 410 is for instance made possible by blocking wheel 416 and then moving pallet truck 402 until a desired length for forks 410 has been reached. At this desired length, parts 412, 414 are fixed relative to each other and blocking of wheel 416 can be released.

For the purpose of extending and/or shortening shown fork 2, 32, 72, forks 2, 32, 72 are placed on the ground surface and/or pressed against an object. As a result of the contact between friction block and ground surface/object or, in the other embodiment, between wheel or roller and ground surface an extension or shortening of fork 2, 32, 72 is realized when fork-lift truck 202 or alternatively pallet truck 402 is displaced. Use is made here of respective friction forces or transmission for the purpose of the extension and/or shortening of forks 2, 32, 72.

The present invention is by no means limited to the above described preferred embodiments thereof. The rights sought are defined by the following claims, within the scope of which many modifications can be envisaged.

The invention claimed is:

1. A modular sliding fork for a fork-lift truck or pallet truck, the modular sliding fork comprising:
- a sliding part configured to be adjusted in length direction relative to a fork part of a fork of the fork-lift truck or pallet truck;
- a drive system for sliding the modular sliding fork relative to the fork part for the purpose of extending and/or shortening the fork; and
- a locking mechanism for locking the modular sliding fork relative to the fork part at a desired position,
- wherein the drive system utilizes a movement of the fork-lift truck or pallet truck for the purpose of sliding the modular sliding fork,
- wherein the drive system is provided with a contact element configured to slide the modular sliding fork in contact with a ground surface, and
- wherein the contact element comprises a drive roller or drive wheel operatively engaged with a coupling between the sliding part and the fork part.

2. The modular sliding fork as claimed in claim 1, wherein the contact element is operatively connected to an energy storage system of the drive system configured to store energy for the purpose of extending and/or shortening the fork.

3. The module sliding fork as claimed in claim 2, wherein the locking mechanism comprises a plurality of locking positions for locking the modular sliding fork relative to the fork part at more than a minimum and maximum length of the fork, wherein the locking mechanism further comprises a locking drive, and wherein the locking drive can be remotely controlled.

4. The modular sliding fork as claimed in claim 1, wherein the contact element is operatively connected to an energy storage system of the drive system configured to store energy for the purpose of extending and/or shortening the fork.

5. The modular sliding fork as claimed in claim 1, wherein the locking mechanism comprises a plurality of locking positions for locking the modular sliding fork relative to the fork part at more than a minimum and maximum length of the fork.

6. The modular sliding fork as claimed in claim 5, wherein the charging mechanism comprises a spring.

7. The modular sliding fork as claimed in claim 1, wherein the locking mechanism further comprises a locking drive, and wherein the locking drive can be remotely controlled.

8. The modular sliding fork as claimed in claim 1, wherein the locking mechanism is provided with a battery.

9. The modular sliding fork as claimed in claim 1, wherein the locking mechanism is provided with a charging mechanism.

10. The modular sliding fork as claimed in claim 1, wherein the locking mechanism comprises a sensor configured to detect a correct locking.

11. A fork-lift truck or pallet truck comprising a modular sliding fork for a fork-lift truck or pallet truck, the modular sliding fork comprising:

a sliding part configured to be adjusted in length direction relative to a fork part of the fork of a fork-lift truck or pallet truck;

a drive system for sliding the modular sliding fork relative to the fork part for the purpose of extending and/or shortening the fork; and a locking mechanism for locking the modular sliding fork relative to the fork part at a desired position, wherein the drive system utilizes a movement of the fork-lift truck or pallet truck for the purpose of sliding the modular sliding fork, wherein the drive system is provided with a contact element configured to slide the modular sliding fork in contact with a ground surface, and wherein the contact element comprises a drive roller or drive wheel operatively engaged with a coupling between the sliding part and the fork part.

12. The fork-lift truck or pallet truck as claimed in claim 11, further comprising a guide configured to guide the relative movement between the modular sliding fork and the fork part.

13. The fork-lift truck or pallet truck as claimed in claim 11, wherein the fork part is provided from a number of strips.

14. A method for providing an extendable fork on a fork-lift truck or pallet truck, comprising of providing a modular sliding fork for a fork-lift truck or pallet truck, the modular sliding fork comprising:

a sliding part configured to be adjusted in length direction relative to a fork part of the fork of a fork-lift truck or pallet truck;

a drive system for sliding the modular sliding fork relative to the fork part for the purpose of extending and/or shortening the fork; and a locking mechanism for locking the modular sliding fork relative to the fork part at a desired position, wherein the drive system utilizes a movement of the fork-lift truck or pallet truck for the purpose of sliding the modular sliding fork, wherein the drive system is provided with a contact element configured to slide the modular sliding fork in contact with a ground surface, and wherein the contact element comprises a drive roller or drive wheel operatively engaged with a coupling between the sliding part and the fork part.

15. The method as claimed in claim 14, further comprising the step of extending and/or shortening the fork by bringing the fork into contact with a ground surface and/or an object, and displacing the fork-lift truck or pallet truck.

* * * * *